US011179847B2

(12) United States Patent
Kalakrishnan et al.

(10) Patent No.: US 11,179,847 B2
(45) Date of Patent: Nov. 23, 2021

(54) SELECTING ACTIONS TO BE PERFORMED BY A ROBOTIC AGENT

(71) Applicant: Google LLC, Mountain View, CA (US)

(72) Inventors: Mrinal Kalakrishnan, Palo Alto, CA (US); Vikas Sindhwani, Hastings-on-Hudson, NY (US)

(73) Assignee: Google LLC, Mountain View, CA (US)

( * ) Notice: Subject to any disclaimer, the term of this patent is extended or adjusted under 35 U.S.C. 154(b) by 201 days.

(21) Appl. No.: 16/341,184

(22) PCT Filed: Oct. 12, 2017

(86) PCT No.: PCT/US2017/056415
§ 371 (c)(1),
(2) Date: Apr. 11, 2019

(87) PCT Pub. No.: WO2018/071724
PCT Pub. Date: Apr. 19, 2018

(65) Prior Publication Data
US 2020/0189098 A1    Jun. 18, 2020

Related U.S. Application Data
(60) Provisional application No. 62/407,418, filed on Oct. 12, 2016.

(51) Int. Cl.
 B25J 9/16    (2006.01)
(52) U.S. Cl.
 CPC ............. *B25J 9/1664* (2013.01); *B25J 9/161* (2013.01); *B25J 9/163* (2013.01); *B25J 9/1653* (2013.01)
(58) Field of Classification Search
 None
 See application file for complete search history.

(56) References Cited

U.S. PATENT DOCUMENTS

| | | | |
|---|---|---|---|
| 6,385,515 B1 * | 5/2002 | Dickson | A01B 69/001 348/120 |
| 8,515,612 B2 * | 8/2013 | Tanaka | G05D 1/0217 701/25 |
| 2017/0235316 A1 * | 8/2017 | Shattil | B64C 39/024 701/3 |

OTHER PUBLICATIONS

Boyd et al., "Distributed optimization and statistical learning via the alternating direction method of multipliers" Foundations on Trends in Machine Learning, 2011, 125 pages.

(Continued)

*Primary Examiner* — Jeff A Burke
*Assistant Examiner* — Jerrod Davis
(74) *Attorney, Agent, or Firm* — Fish & Richardson P.C.

(57) ABSTRACT

Methods, systems, and apparatus, including computer programs encoded on a computer storage medium, for a system configured to plan actions to be performed by a robotic agent interacting with an environment to accomplish an objective by determining an optimized trajectory of state—action pairs for accomplishing the objective. The system maintains a current optimized trajectory and a current trust region radius, and optimizes a localized objective within the current trust region radius of the current optimized trajectory to determine a candidate updated optimized trajectory. The system determines whether the candidate updated optimized trajectory improves over the current optimized trajectory. In response to determining that the candidate updated optimized trajectory improves over the current optimized trajectory, the system updates the current optimized trajectory to the candidate updated optimized trajectory and updates the current trust region radius.

19 Claims, 4 Drawing Sheets

(56) References Cited

OTHER PUBLICATIONS

Deits et al., "Computing large convex regions of obstacle-free space through semidefinite programming" Workshop on the Algorithmic Fundamentals of Robotics, 2014, 16 pages.
Diamond et al., "A general system for heuristic solution of convex problems over nonconvex sets" arXiv, Jan. 2016, 39 pages.
Duan et al., "Planning locally optimal, curvature-constrained trajectories in 3d using sequential convex optimization" ICRA, 2014, 7 pages.
Dubins, "On curves of minimal length with a constraint on average curvature and with prescribed initial and terminal positions and tangents" American Journal of Mathematics, Jul. 1957, 21 pages.
Dunn et al., "Efficient dynamic programming implementations of newton's method for unconstrained optimal control problems" Journal of Optimization Theory and Application, 1989, 16 pages.
Fletcher et al., "Nonlinear programming without a penalty function" Mathematical Programming, Mathematics Subject Classification, 2000, 32 pages.
Gill et al., "Snopt: A sqp algorithm for large-scale constrained optimization" Society for Industrial and Applied Mathematics, 2005, 33 pages.
Gong et al., "A general iterative shrinkage and thresholding algorithm for non-convex regularized optimization problems" International Conference on Machine Learning, Mar. 2013, 9 pages.
Karlgaard et al., "Comparison of several nonlinear filters for a benchmark tracking problem" AIAA Guidance, Navigation, and Control Congerence and Exhibit, Aug. 2006, 18 pages.
Levine et al., "End-to-end training of deep visuomotor policies" Journal of Machine Learning Research, Apr. 2016, 40 pages.
Li et al., "Iterative linear quadratic regulator design for nonlinear biological movement systems" International Conference on Informatics in Control, Automation and Robotics, 2004, 8 pages.
Nagahara et al., "Maximum hands-off control: A paradigm for control effort minimization" arXiv, May 2015, 13 pages.
O'Donoghue et al., "A splitting method for optimal control" IEEE Transactions on Control Systems Technology, Nov. 2013, 11 pages.
Parikh et al., "Proximal algorithms" Foundations and Trends in Machine Learning, 2013, 113 pages.
PCT International Preliminary Report on Patentability in International Application No. PCT/US2017/056415, dated Apr. 25, 2019, 10 pages.
PCT International Search Report and Written Opinion in International Application No. PCT/US2017/056415, dated Feb. 16, 2018, 15 pages.
Raghunathan et al., "Infeasibility detection in alternating direction method of multipliers for convex quadratic programs", IEEE 53rd Annual Conference on Decision and Control (CDC), Dec. 2014, 8 pages.
Schulman et al., "Finding Locally Optimal, Collision-Free Trajectories with Sequential Convex Optimization", Robotics: Science and Systems IX, Jun. 23, 2013 (Jun. 23, 2013), XP055442681, DOI: 10.15607/RSS.2013.IS.031 ISBN: 978-981-0739-37-9 abstract p. 1-p. 3, p. 8, figure 1.
Schulman et al., "Motion planning with sequential convex optimization and convex collision checking" International Journal of Robotics Research, Jun. 2014, 17 pages.
Tassa et al., "Control-limited differential dynamic programming" International Conference on Robotics and Automation, 2014, 8 pages.
Tenny et al., "Nonlinear model predictive control via feasibility-perturbed sequential quadratic programming" Computational Optimization and Applications, 2004, 35 pages.
Wang et al., "Global convergence of admm in nonconvex nonsmooth optimization" arXiv, Nov. 2016, 29 pages.
pybullet.com [online], "Bullet Real-Time Physics Simulation," Dec. 2017, [retrieved on Aug. 2, 2019], retrieved from: URL<https://pybullet.org/wordpress/>, 2 pages.

* cited by examiner

SELECTING ACTIONS TO BE PERFORMED BY A ROBOTIC AGENT

This application is a national stage application under 35 U.S.C. § 371 of PCT International Application No. PCT/US2017/056415, filed on Oct. 10, 2017, which claims the benefit of U.S. Non-Provisional Application Ser. No. 62/407,418, filed on Oct. 12, 2016. The contents of the foregoing applications are hereby incorporated by reference.

BACKGROUND

This specification relates to selecting actions to be performed by a robotic agent.

Robotic agents interact with an environment by performing actions in order to accomplish an objective, i.e., perform a robotic task. In some cases, the objective is expressed as an objective function. That is, the robotic agent's objective is to perform a set of actions that optimize the objective function.

SUMMARY

This specification describes a system implemented as computer programs on one or more computers in one or more locations that plans actions to be performed by a robotic agent interacting with an environment to accomplish an objective.

In general, one innovative aspect may be embodied in a method for planning actions to be performed by a robotic agent interacting with an environment to accomplish an objective, the method comprising: determining an optimized trajectory of state—action pairs for accomplishing the objective, the state in each state—action pair being a state encountered by the robotic agent during interaction with the environment and the action in the state—action pair being an action to be performed by the robotic agent when the environment is in the state, and the determining comprising: maintaining a current optimized trajectory and a current trust region radius; optimizing a localized objective within the current trust region radius of the current optimized trajectory to determine a candidate updated optimized trajectory; determining whether the candidate updated optimized trajectory improves over the current optimized trajectory; and in response to determining that the candidate updated optimized trajectory improves over the current optimized trajectory, updating the current optimized trajectory to the candidate updated optimized trajectory and updating the current trust region radius.

In some implementations, updating the current optimized trajectory to the candidate updated optimized trajectory and updating the current trust region radius comprises: increasing the current trust radius.

In some implementations, the method further comprises: in response to determining that the candidate updated optimized trajectory does not improve over the current optimized trajectory, updating the current trust region radius without updating the current optimized trajectory.

In some implementations, updating the current trust region radius without updating the current optimized trajectory comprises shrinking the current trust radius.

In some implementations, optimizing the localized objective within the current trust region radius of the current optimized trajectory comprises optimizing the localized objective using a consensus alternating direction method of multipliers (ADMM) optimization.

In some implementations, the objective is expressed as a cost function to be minimized by the optimized trajectory, and the method further comprises: convexifying the cost function around the current optimized trajectory; and optimizing the localized objective within the current trust region radius of the current optimized trajectory comprises: optimizing the convexified cost function within the current trust region radius of the current optimized trajectory.

In some implementations, the optimized trajectory has constraints associated with the dynamics of the environment that are required to be satisfied (for example, the optimized trajectory satisfies dynamics of the environment) and the method further comprises: linearizing the dynamics of the environment within a vicinity of the current optimized trajectory; and optimizing the localized objective within the current trust region radius of the current optimized trajectory comprises: optimizing the localized objective within the current trust region radius of the current optimized trajectory to determine a candidate updated optimized trajectory that satisfies the linearized dynamics.

In some implementations, the optimized trajectory has additional constraints on navigation of the robotic agent through the environment (for example, the optimized trajectory satisfies the additional constraints) and the method further comprises: convexifying or partially convexifying the additional constraints around the current optimized trajectory; and wherein optimizing the localized objective within the current trust region radius of the current optimized trajectory comprises: optimizing the localized objective within the current trust region radius of the current optimized trajectory to determine a candidate updated optimized trajectory that satisfies the convexified or partially convexified additional constraints.

In some implementations, the method further comprises: maintaining a filter of cost satisfaction—constraint satisfaction pairs, each pair comprising a cost satisfaction measure and a constraint satisfaction measure for either (i) the current optimized trajectory or (ii) a previous optimized trajectory, and wherein determining whether the candidate updated optimized trajectory improves over the current optimized trajectory comprises: determining a cost satisfaction measure and a constraint satisfaction measure for the candidate updated optimized trajectory; and determining that the candidate updated optimized trajectory improves over the current optimized trajectory when no pair in the filter has both (i) a cost satisfaction measure that is superior to the cost satisfaction measure for the candidate updated optimized trajectory and (ii) a constraint satisfaction measure that is superior to the constraint satisfaction measure for the candidate updated optimized trajectory. In some implementations determining whether the candidate updated optimized trajectory improves over the current optimized trajectory comprises determining whether the candidate updated optimized trajectory sufficiently improves over the current optimized trajectory.

In some implementations, the method further comprises: in response to determining that the candidate updated optimized trajectory improves over the current optimized trajectory, removing from the filter any pair having both (i) a cost satisfaction measure that is inferior to the cost satisfaction measure for the candidate updated optimized trajectory and (ii) a constraint satisfaction measure that is inferior to the constraint satisfaction measure for the candidate updated optimized trajectory.

The above aspects can be implemented in any convenient form. For example, aspects and implementations may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs.

Particular embodiments of the subject matter described in this specification can be implemented so as to realize one or more of the following advantages. An action selection system as described in this specification is configured to handle non-smooth and non-separable objective functions and to incorporate state constraints, unlike conventional methods such as the iterative linear quadratic regulator (iLQR) method, and is therefore applicable to a broader class of action selection problems than conventional methods such as the iLQR method. Moreover, the action selection system as described in this specification achieves similar results to conventional methods but displays faster convergence behavior than conventional methods, i.e. determines the planned actions to be performed by the robotic agent more quickly than conventional methods, and therefore uses computational resources more efficiently in planning actions to be performed by robotic agents. The action selection system may provide improved planning of actions to be performed by a robotic agent interacting with an environment to accomplish an objective such that, when executed, the robotic agent may interact with the environment to accomplish the objective in an improved way.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
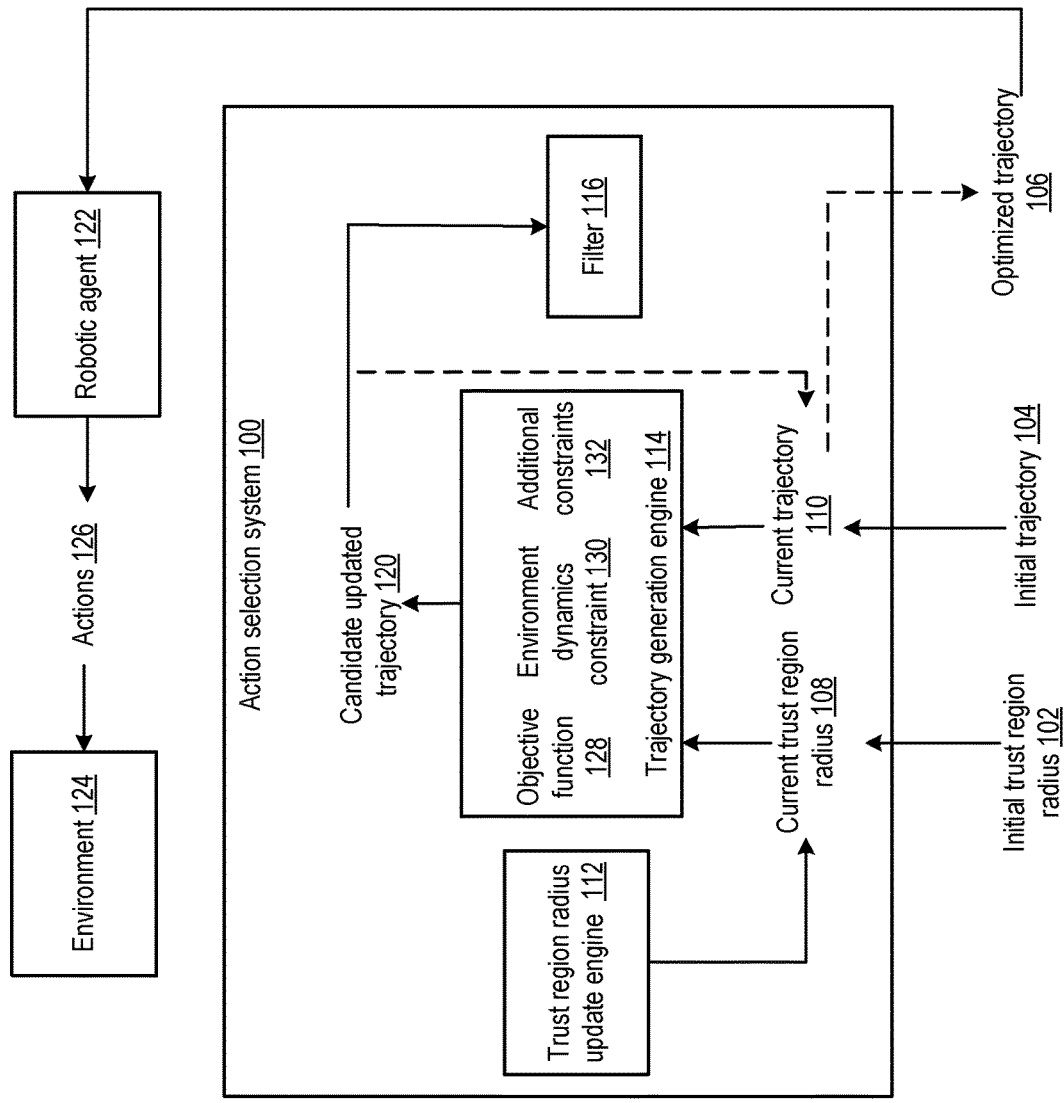
FIG. 1 shows an example action selection system.

FIG. 1 shows an example action selection system 100. The action selection system 100 is an example of a system implemented as computer programs on one or more computers in one or more locations in which the systems, components, and techniques described below are implemented.

The action selection system 100 plans actions 126 to be performed at a sequence of multiple time steps by a robotic agent 122 interacting with an environment 124 to accomplish a goal, where accomplishing the goal corresponds to performing actions 126 that optimize an objective function 128.

In particular, the system 100 determines an optimized trajectory 106 of state—action pairs that optimizes the objective function 128, subject to the optimized trajectory 106 satisfying an environment dynamics constraint 130 and, in some cases, other additional constraints 132.

A trajectory of state—action pairs is an ordered sequence of state—action pairs, where each state—action pair corresponds to a respective time step in the sequence of time steps. The state in each state—action pair is a state encountered by the agent 122 during interaction with the environment 124 and the action in the state—action pair is an action to be performed by the agent 122 when the environment 124 is in the state, i.e., as defined by the trajectory.

In some implementations, the objective function 128 is a Maximum "Hands Off" Control objective function, which is optimized by trajectories where the action sequence is as sparse as possible, i.e. by trajectories where the agent 122 performs actions at as few time steps as possible. In some other implementations, the objective function 128 is a path length objective function, which is optimized by trajectories where the path through the environment defined by the sequence of states has as short a length as possible.

In some implementations, the additional constraints include bound constraints of the form: $\tau_{min} \leq \tau \leq \tau_{max}$, where the trajectory $\tau$ is required to stay between a lower bound $\tau_{min}$ and an upper bound $\tau_{max}$. Bound constraints may be imposed to keep the actions of the trajectory within physical limits of the actuators of the agent 122 and to guide the evolution of the states of the trajectory along specific way points in the state space. In some implementations, the additional constraints include "safety" constraints that require trajectories to avoid collision with obstacles in the environment by requiring the states of the trajectory to lie within a safe margin from obstacles of the environment 124.

In general, the state of the environment 124 changes between time steps based on the dynamics of the environment 124, which define an environment dynamics mapping from a current state of the environment 124 at a current time step and a current action 126 of the agent at the current time step to a corresponding state of the environment 124 at the next time step. The dynamics of the environment may be non-linear. A trajectory satisfies the environment dynamics constraint 130 if for each time step, the transition from the state—action pair of the trajectory for the time step to the state of the state—action pair for the next time step satisfies the environment dynamics mapping.

The system 100 determines the optimized trajectory 106 by iteratively updating a currently maintained trajectory 110 using a trajectory generation engine 114. That is, the system 100 iteratively updates the currently maintained trajectory 110 multiple times to determine the final optimized trajectory 106.

In particular, at each iteration, the system 100 maintains a current trajectory 110 and a current trust region radius 108. In general, the current trust region radius 108 is a vector with the same dimension as a trajectory, with a particular trust region radius corresponding to each state and each action of each state—action pair of a trajectory. In some implementations, one trust region radius is used for the states of a trajectory, and a second trust region radius is used for the actions of a trajectory. In some other implementations, a different particular trust region radius is used for each state and each action of each state—action pair of a trajectory. For the first iteration, the system is initialized with an initial trust region radius 102 and an initial trajectory 104.

The trajectory generation engine 114 then optimizes a localized objective function within the current trust region radius 108 of the current trajectory 110 to determine a candidate updated trajectory 120.

In particular, the localized objective function is a convex or partially convex approximation to the objective function 128 and the trajectory generation engine 114 determines a candidate updated trajectory 120 by optimizing the localized objective function in the current trust region radius 108 subject to linearized environment dynamic constraints and, in some cases, convexified or partially-convexified additional constraints.

For example, the trajectory generation engine 114 can optimize the localized objective function using an alternating direction method of multipliers (ADMM) optimization. In this example, the localized objective function, linearized environment dynamics constraint, and convexified or partially convexified additional constraints are separated, allowing a sequence of ADMM solvers to orchestrate cheap and parallelizable projection and proximal operators towards constraint satisfaction and cost optimization while optimizing the localized objective. An example process for determining a candidate updated trajectory is described with reference to process 400 of FIG. 4.

The system 100 determines whether the candidate updated trajectory sufficiently improves over the current trajectory using a filter 116. An example process for determining whether a candidate updated trajectory sufficiently improves over the current trajectory is described with reference to process 300 of FIG. 3.

If the system 100 determines that the candidate updated trajectory 120 does not sufficiently improve over the current trajectory 110, the trust region radius update engine 112 updates the current trust region radius 108 without updating the current trajectory 110, i.e., by shrinking the current trust region radius 108 so the next iteration is performed starting from the same current trajectory 110 but with a decreased trust region radius.

If the system 100 determines that the candidate updated trajectory 120 does sufficiently improve over the current trajectory 110, the trust region radius update engine 112 updates the current trust region radius 108 and updates the current trajectory 110 to be the candidate updated trajectory 120, i.e., by increasing the current trust region radius 108 so the next iteration is performed starting from the candidate updated trajectory 120 and with an increased trust region radius.

After a pre-determined number of iterations, the system 100 outputs the current trajectory 110 as the optimized trajectory 106.

Figure 2:
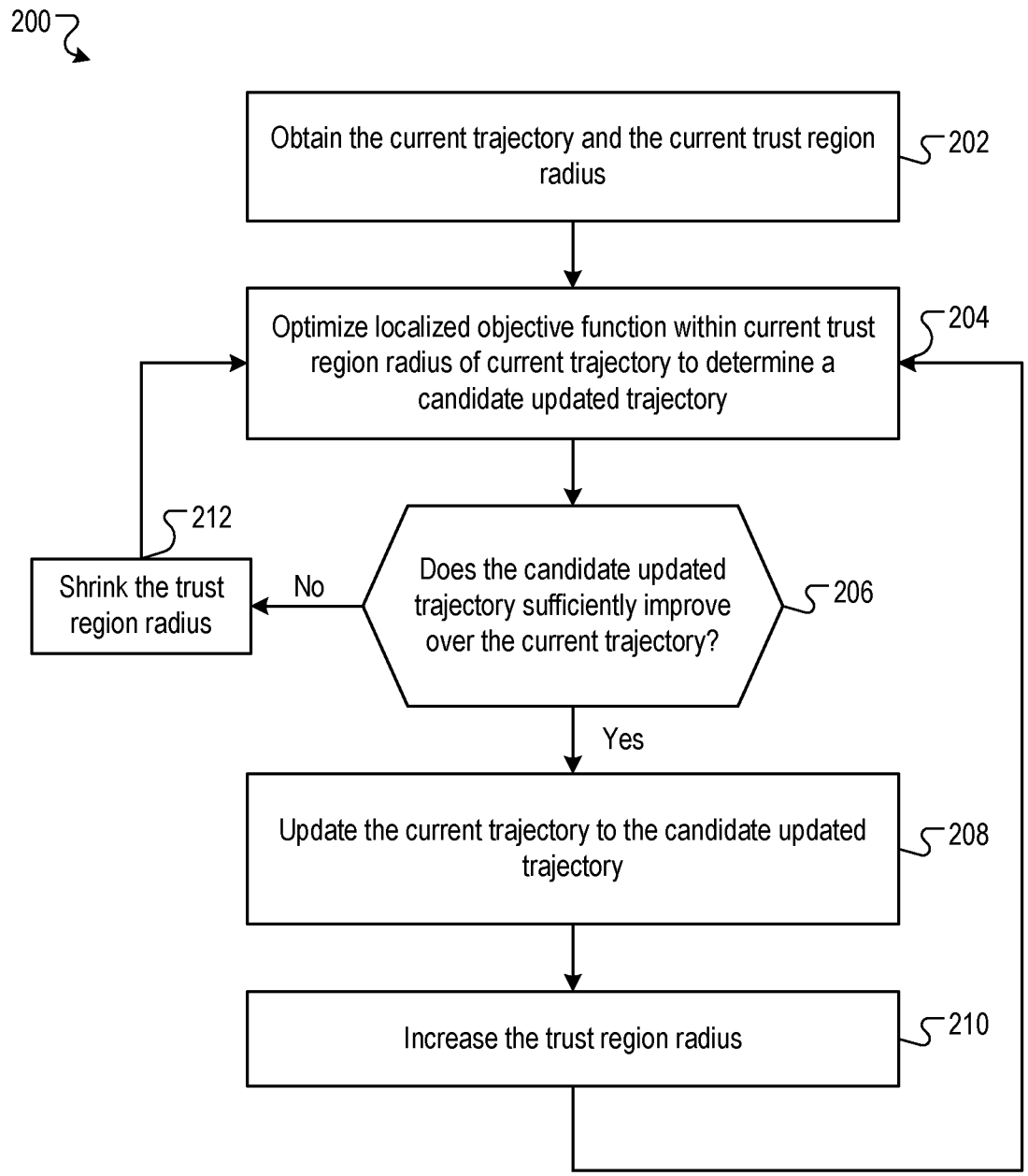
FIG. 2 is a flow diagram of an example process for updating the current trajectory and current trust region radius.

FIG. 2 is a flow diagram of an example process 200 for updating the current trajectory. For convenience, the process 200 will be described as being performed by a system of one or more computers located in one or more locations. For example, an action selection system, e.g., the action selection system 100 of FIG. 1, appropriately programmed in accordance with this specification, can perform the process 200.

The system obtains the current trajectory and the current trust region radius (step 202). For the first iteration, the system obtains an initial trajectory and an initial trust region radius. The initial trajectory may be determined by setting the action of each state—action pair of the trajectory arbitrarily, e.g. setting the actions randomly or setting them to zero, and by setting the corresponding state of each state—action pair in accordance with the environment dynamics mapping. The initial trust region radius may be set to an arbitrary value, where the arbitrary value is tuned with respect to system performance during simulations.

Next, the trajectory generation engine determines a candidate updated trajectory that optimizes a localized objective function within the current trust region radius of the current trajectory, where the optimization is subject to linearized environment dynamics constraints and, in some cases, other convexified or partially-convexified additional constraints (step 204). An example process for determining a candidate updated trajectory that optimizes the localized objective function within the current trust region radius of the current trajectory is described below with reference to process 400 of FIG. 4.

Next, the system determines whether the candidate updated trajectory generated by the trajectory generation engine sufficiently improves over the current trajectory (step 206). An example process for determining whether a candidate updated trajectory sufficiently improves the current trajectory is described below with reference to process 300 of FIG. 3.

In response to determining that the candidate updated trajectory does sufficiently improve over the current trajectory, the system updates the current trajectory to be the candidate updated trajectory (step 208) and increases the trust region radius (step 210). In some implementations, the trust region radius update engine increases the current trust region radius by doubling the current trust region radius. The process then returns to step 204, and repeats the preceding steps.

In response to determining that the candidate updated trajectory does not sufficiently improve over the current trajectory, the system does not update the current trajectory and the trust region radius update engine decreases the trust region radius (step 212). In some implementations, the trust region radius update engine decreases the current trust region radius by halving the current trust region radius. The process then returns to step 204, and repeats the preceding steps.

In general, the system repeats the process 200 until a termination criterion is satisfied. In some implementations, the termination criterion is the system performing a maximum number of iterations of the process 200. In some implementations, the termination criterion is candidate updated trajectory showing insignificant improvement over the current trajectory, for example by the output of the objective function evaluated on the candidate updated trajectory improving on the output of the objective function evaluated on the current trajectory by less than a pre-determined threshold. In some implementations, the termination criterion is the current trust region radius shrinking below a pre-specified threshold. In some implementations, the termination criterion is a combination of the previously described termination criteria. Once the termination criterion is satisfied, the system outputs the current trajectory as the optimized trajectory which is provided to the robotic agent.

Figure 3:
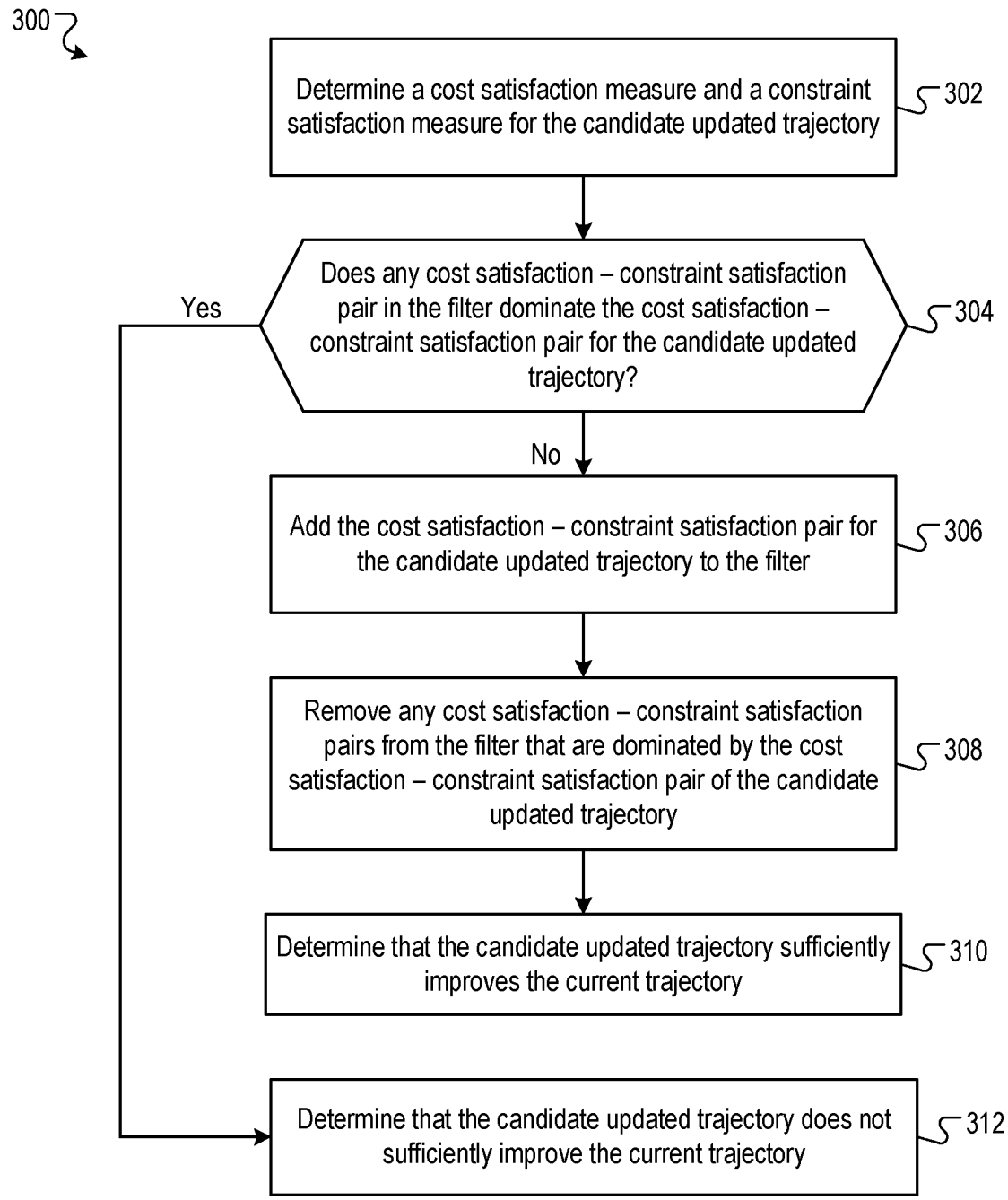
FIG. 3 is a flow diagram of an example process for determining whether a candidate updated trajectory sufficiently improves the current trajectory.

FIG. 3 is a flow diagram of an example process 300 for determining whether a candidate updated trajectory sufficiently improves the current trajectory. For convenience, the process 300 will be described as being performed by a system of one or more computers located in one or more locations. For example, an action selection system, e.g., the action selection system 100 of FIG. 1, appropriately programmed in accordance with this specification, can perform the process 300.

Given a candidate updated trajectory output by the trajectory generation engine, the system determines a cost satisfaction—constraint satisfaction pair for the candidate updated trajectory (step 302).

In general, the system determines the cost satisfaction component of the cost satisfaction—constraint satisfaction pair as the output of the objective function evaluated on the candidate updated trajectory.

In general, the system determines the constraint satisfaction component of the cost satisfaction—constraint satisfaction pair as the sum of multiple terms that reflect how well the trajectory conforms to the environment dynamics constraint and, in some cases, the other additional constraints. For example, the environment dynamics constraint satisfaction may be expressed as:

$$\sum_{t=0}^{T} |x_{t+1} - f(x_t, u_t)|_1,$$

where T is the total number of time steps in the candidate updated trajectory, $x_t$ is the state of the environment at time t in the candidate updated trajectory, $u_t$ is the action of the agent at time t in the candidate updated trajectory, and $f(x_t, u_t)$ is the environment dynamics mapping i.e. the mapping that determines the next state of the environment according to the environment dynamics.

As another example, if the additional constraints include a bound constraint of the form $\tau_{min} \leq \tau \leq \tau_{max}$, then the bound constraint satisfaction may be expressed as:

$$|\max(\tau-\tau_{max},0)+\max(\tau_{min}-\tau,0)|_1$$

where τ is the candidate updated trajectory, $\tau_{max}$ is the pre-determined upper bound on the trajectories according to the bound constraint, $\tau_{min}$ is the pre-determined lower bound on the trajectories according to the bound constraint, and $\tau_{max}$ and $\tau_{min}$ have the same dimension as τ. Bound constraints may be imposed to keep the actions of the trajectory within physical limits of the actuators of the agent and to guide the evolution of the states of the trajectory along specific way points in the state space.

As yet another example, if the additional constraints include a set of K inequalities of the form $g(x_t) \leq 0$, t=1, . . . ,T, where g: $\mathbb{R}^n \to \mathbb{R}^K$ and $x_t$ is the state of the environment at time t in the candidate updated trajectory, then a term in the constraint satisfaction may be expressed as:

$$\sum_{t=0}^{T} |\max(g(x_t), 0)|_1$$

For example, the set of K inequalities may represent a safety of the state $x_t$ at time t by measuring a notion of safety margin with respect to K obstacles.

Next, the system determines whether any cost satisfaction—constraint satisfaction pairs in the filter dominate the cost satisfaction—constraint satisfaction pair that the system determined for the candidate updated trajectory (step 304).

In general, a first cost satisfaction—constraint satisfaction pair is said to dominate a second cost satisfaction—constraint satisfaction pair if the cost satisfaction component of the first pair is superior to the cost satisfaction component of the second pair, and the constraint satisfaction component of the first pair is superior to the constraint satisfaction component of the second pair. For example, if the objective function is a cost function that the system seeks to minimize, then the cost satisfaction component of the first pair is superior to the cost satisfaction component of the second pair if the cost satisfaction component of the first pair is less than the cost satisfaction component of the second pair. As another example, if the dynamics constraint satisfaction, bound constraint satisfaction, and safety constraint satisfaction are defined as above, then the constraint satisfaction component of the first pair is superior to the constraint satisfaction component of the second pair is the constraint satisfaction component of the first pair is less than the constraint satisfaction component of the second pair.

In response to determining that no cost satisfaction—constraint satisfaction pair in the filter dominates the cost satisfaction—constraint satisfaction pair of the candidate updated trajectory, the system adds the cost satisfaction—constraint satisfaction pair for the candidate updated optimized trajectory to the filter (step 306) and removes any cost satisfaction—constraint satisfaction pairs from the filter that are dominated by the cost satisfaction—constraint satisfaction pair of the candidate updated trajectory (step 308). Moreover, the system determines that the candidate updated trajectory sufficiently improves the current trajectory (step 310).

In response to determining that a cost satisfaction—constraint satisfaction pair in the filter dominates the cost satisfaction—constraint satisfaction pair of the candidate updated trajectory, the system determines that the candidate updated trajectory does not sufficiently improve the current trajectory (step 312). In this case, the cost satisfaction—constraint satisfaction pair of the candidate updated trajectory is not added to the filter.

Figure 4:
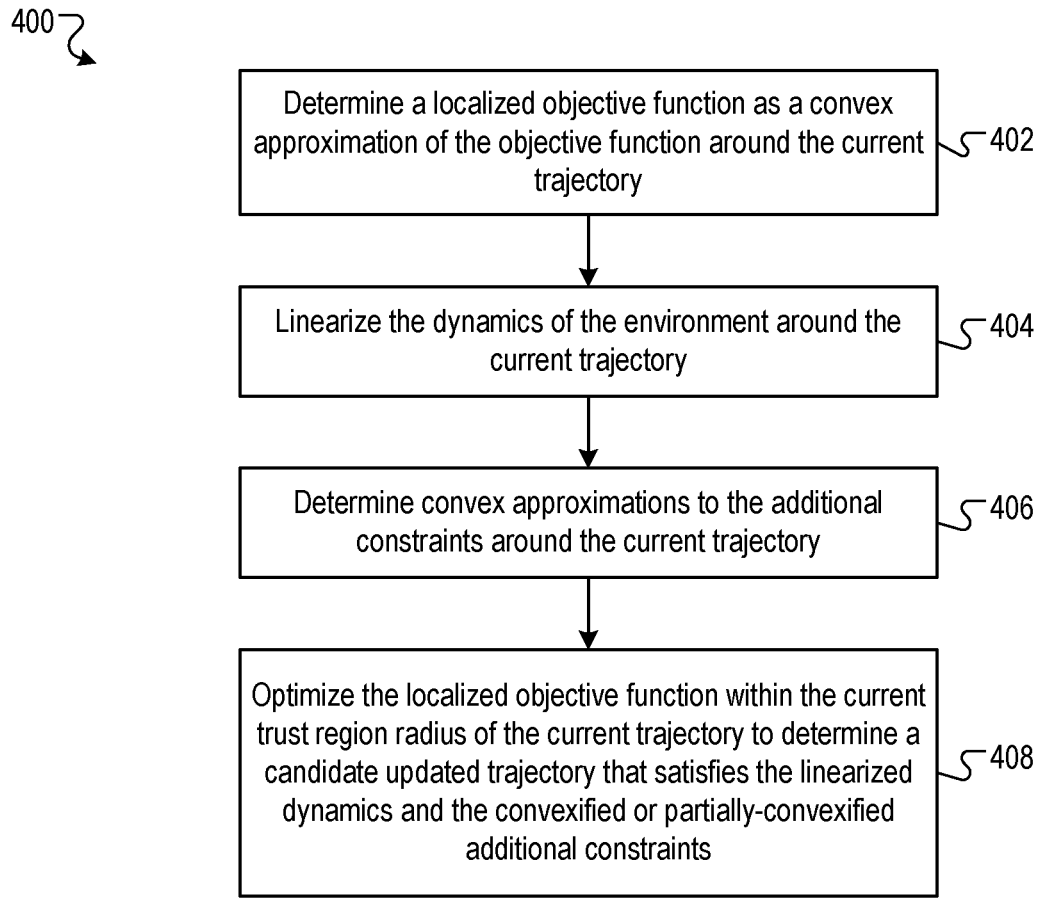
FIG. 4 is a flow diagram of an example process for determining a candidate updated trajectory.

FIG. 4 is a flow diagram of an example process 400 for determining a candidate updated trajectory. For convenience, the process 400 will be described as being performed by a system of one or more computers located in one or more locations. For example, an action selection system, e.g., the action selection system 100 of FIG. 1, appropriately programmed in accordance with this specification, can perform the process 400.

The system determines a localized objective function by determining a convex or partially convex approximation to the objective function around the current trajectory, i.e. by convexifying or partially convexifying the objective function around the current trajectory (step 402). The objective function is not necessarily convex, differentiable, or separable across time. In cases where the objective function is differentiable, determining a convex or partially convex approximation to the objective function may involve determining a linear or quadratic approximation of the objective function around the current trajectory based on determining the constant, linear, and in some cases, quadratic terms of a Taylor series expansion of the objective function around the current trajectory. In cases where the objective function contains convex but non-differentiable terms, those terms may be maintained as-is in the localized objective. In cases where the objective function contains non-convex and non-differentiable terms that admit efficiently computable projection and proximal operators, those terms may be maintained as-is in the localized objective.

The system determines linearized environment dynamics by linearizing the environment dynamics mapping around the current trajectory (step 404). In some cases, linearizing the environment dynamics mapping around the current trajectory is based on determining the constant and linear terms of a Taylor series expansion of the environment dynamics mapping around the current trajectory.

The system determines convex approximations of some of the additional constraints around the current trajectory (step 406). For example, if the additional constraints include a set of K inequalities of the form $g(x_t) \leq 0$, t=1, . . . , T, where g: $\mathbb{R}^n \to \mathbb{R}^K$ and $x_t$ is the state of the environment at time t in the candidate updated trajectory, then determining convex approximations of the additional constraints involves determining a convex approximation of the function g around the state $x_t$ of the current trajectory for each time step t. In some cases, determining a convex approximation of the function g around the state $x_t$ of the current trajectory is based on determining the constant, linear, and in some cases quadratic terms of a Taylor series expansion of the function g around the state $x_t$ of the current trajectory.

In general, the additional constraints may include non-convex constraints that admit fast and accurate projections. For example, hard sparsity on actions, i.e. the constraint set $\Sigma_{t=0}^{T}|u_t|_0$ can be imposed via hard thresholding operations, and unit sphere constraints on state variables encoding 3D-pose via unit Quaternions can be imposed simply via normalization. These additional constraints that admit fast and accurate projections are not convexified.

The trajectory generation engine optimizes the localized objective function within the current trust region radius of the current trajectory to determine a candidate updated trajectory that satisfies the linearized environment dynamics constraints, and in some cases the convexified additional constraints and the additional constraints that admit fast and accurate projections (step 408). In particular, the trajectory generation engine optimizes:

$$\operatorname{argmin}_{\tau \in F(\tau^k) \cap B(\tau^k) \cap S(\tau^k) \cap N} c_{\tau^k}(\tau),$$

where $\tau^k$ is the current trajectory at the current iteration, i.e. iteration k, $c_{\tau^k}$ is the localized objective function at the current iteration, $F(\tau^k)$ is the set of trajectories satisfying the linearized environment dynamics around $\tau^k$, $B(\tau^k)$ is a bound constraint box restricted, given by:

$$\tau_{min} \leq \tau \leq \tau_{max}$$

where $\tau_{min}$ and $\tau_{max}$ are pre-determined bound constraints, $S(\tau^k)$ is the convexification of additional constraints S around $\tau^k$, and N are the additional constraints that admit fast and accurate projections. The optimization is subject to the additional constraint that the trajectory $\tau$ be within the current trust region radius $\mu^k$ of $\tau^k$. In some implementations, the current trust region radius is implemented as box-shaped constraint region around $\tau^k$. In some other implementations, the current trust region radius is implemented as a spherical-shaped constraint region around $\tau^k$.

For example, the trajectory generation engine can optimize the localized objective function using an iterative consensus alternating direction method of multipliers (ADMM) optimization. In this example, the localized objective function, linearized environment dynamics constraint, the convexified additional constraints, and the additional constraints that admit fast and accurate projections are separated, allowing a sequence of ADMM solvers to orchestrate cheap and parallelizable projection and proximal operators towards constraint satisfaction and cost optimization while optimizing the localized objective. In this example, the trajectory generation engine executes a pre-determined maximum number of consensus ADMM iterations to optimize the localized objective function within the current trust region radius, but potentially executes fewer than the pre-determined maximum number of iterations if the value of the dual residual variable of consensus ADMM falls below a pre-determined threshold. In general, the objective function trajectory, environment dynamics constraint trajectory, and additional constraint trajectories of the consensus ADMM optimization are "warm-started" by initializing them to the final objective function trajectory, final environment dynamics constraint trajectory, and final additional constraint trajectories respectively from the last application of consensus ADMM to optimize the localized objective function. An example method for ADMM optimization is described in Stephen Boyd, et al., "Distributed Optimization and Statistical Learning via the Alternating Direction Method of Multipliers," Foundations and Trends in Machine Learning, Volume 3, Issue 1, pages 1-122, 2011.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of planning actions to be performed by a robotic agent interacting with an environment to accomplish an objective, the method comprising:
   determining an optimized trajectory of state—action pairs for accomplishing the objective, the state in each state action pair being a state encountered by the robotic agent during interaction with the environment and the action in the state—action pair being an action to be performed by the robotic agent when the environment is in the state, and the determining comprising:
      maintaining a current optimized trajectory and a current trust region radius;
      linearizing an environment dynamics mapping within a vicinity of the current optimized trajectory, wherein the environment dynamics mapping defines a mapping from an input state of the environment and an input action of the robotic agent to an output state of the environment that would result from performing the input action in response to the input state of the environment;
      optimizing a localized objective within the current trust region radius of the current optimized trajectory to determine a candidate updated optimized trajectory subject to a constraint that the candidate updated optimized trajectory satisfies the linearized environment dynamics mapping, wherein the constraint requires that, for each state—action pair in the candidate updated optimized trajectory before a last state—action pair in the candidate optimized trajectory:
         a result of processing the state and the action in the state—action pair using the linearized environment dynamics mapping matches the state in a next state—action pair in the candidate optimized trajectory;
      determining whether the candidate updated optimized trajectory improves over the current optimized trajectory; and
      in response to determining that the candidate updated optimized trajectory improves over the current optimized trajectory, updating the current optimized trajectory to the candidate updated optimized trajectory and updating the current trust region radius.

2. The method of claim 1, wherein updating the current optimized trajectory to the candidate updated optimized trajectory and updating the current trust region radius comprises:
   increasing the current trust radius.

3. The method of claim 1, further comprising:
   in response to determining that the candidate updated optimized trajectory does not improve over the current optimized trajectory, updating the current trust region radius without updating the current optimized trajectory.

4. The method of claim 3, wherein updating the current trust region radius without updating the current optimized trajectory comprises:
   shrinking the current trust radius.

5. The method of claim 1, wherein the localized objective function comprises one or more non-convex and non-differentiable terms, and wherein optimizing the localized objective within the current trust region radius of the current optimized trajectory comprises:
   optimizing the localized objective comprising the one or more non-convex and non-differentiable terms using a consensus alternating direction method of multipliers (ADMM) optimization.

6. The method of claim 1, wherein the objective is expressed as a cost function to be minimized by the optimized trajectory, and wherein the method further comprises:
   convexifying or partially convexifying the cost function around the current optimized trajectory; and
   wherein optimizing the localized objective within the current trust region radius of the current optimized trajectory comprises:
   optimizing the convexified or partially convexified cost function within the current trust region radius of the current optimized trajectory.

7. The method of claim 1, wherein the optimized trajectory has additional constraints on navigation of the robotic agent through the environment and wherein the method further comprises:
   convexifying or partially convexifying the additional constraints around the current optimized trajectory; and
   wherein optimizing the localized objective within the current trust region radius of the current optimized trajectory comprises:
   optimizing the localized objective within the current trust region radius of the current optimized trajectory to determine a candidate updated optimized trajectory that satisfies the convexified or partially convexified additional constraints.

8. The method of claim 1, further comprising:
   maintaining a filter of cost satisfaction—constraint satisfaction pairs, each pair comprising a cost satisfaction measure and a constraint satisfaction measure for either (i) the current optimized trajectory or (ii) a previous optimized trajectory, and wherein determining whether the candidate updated optimized trajectory improves over the current optimized trajectory comprises:
   determining a cost satisfaction measure and a constraint satisfaction measure for the candidate updated optimized trajectory; and
   determining that the candidate updated optimized trajectory improves over the current optimized trajectory when no pair in the filter has both (i) a cost satisfaction measure that is superior to the cost satisfaction measure for the candidate updated optimized trajectory and (ii) a constraint satisfaction measure that is superior to the constraint satisfaction measure for the candidate updated optimized trajectory.

9. The method of claim 8, further comprising:
   in response to determining that the candidate updated optimized trajectory improves over the current optimized trajectory, removing from the filter any pair having both (i) a cost satisfaction measure that is inferior to the cost satisfaction measure for the candidate updated optimized trajectory and (ii) a constraint satisfaction measure that is inferior to the constraint satisfaction measure for the candidate updated optimized trajectory.

10. The method of claim 1, further comprising:
performing, by the robotic agent, the planned actions to accomplish the objective based upon the optimized trajectory.

11. A system comprising one or more computers and one or more storage devices storing instructions that when executed by the one or more computers cause the one more computers to plan actions to be performed by a robotic agent interacting with an environment to accomplish an objective, the planning comprising:
determining an optimized trajectory of state—action pairs for accomplishing the objective, the state in each state—action pair being a state encountered by the robotic agent during interaction with the environment and the action in the state—action pair being an action to be performed by the robotic agent when the environment is in the state, and the determining comprising:
maintaining a current optimized trajectory and a current trust region radius;
linearizing an environment dynamics mapping within a vicinity of the current optimized trajectory, wherein the environment dynamics mapping defines a mapping from an input state of the environment and an input action of the robotic agent to an output state of the environment that would result from performing the input action in response to the input state of the environment;
optimizing a localized objective within the current trust region radius of the current optimized trajectory to determine a candidate updated optimized trajectory subject to a constraint that the candidate updated optimized trajectory satisfies the linearized environment dynamics mapping, wherein the constraint requires that, for each state—action pair in the candidate updated optimized trajectory before a last state—action pair in the candidate optimized trajectory:
a result of processing the state and the action in the state—action pair using the linearized environment dynamics mapping matches the state in a next state—action pair in the candidate optimized trajectory;
determining whether the candidate updated optimized trajectory improves over the current optimized trajectory; and
in response to determining that the candidate updated optimized trajectory improves over the current optimized trajectory, updating the current optimized trajectory to the candidate updated optimized trajectory and updating the current trust region radius.

12. The system of claim 11, wherein updating the current optimized trajectory to the candidate updated optimized trajectory and updating the current trust region radius comprises:
increasing the current trust radius.

13. The system of claim 11, wherein the planning further comprises:
in response to determining that the candidate updated optimized trajectory does not improve over the current optimized trajectory, updating the current trust region radius without updating the current optimized trajectory.

14. The system of claim 13, wherein updating the current trust region radius without updating the current optimized trajectory comprises:
shrinking the current trust radius.

15. The system of claim 11, wherein the localized objective function comprises one or more non-convex and non-differentiable terms, and wherein optimizing the localized objective within the current trust region radius of the current optimized trajectory comprises:
optimizing the localized objective comprising the one or more non-convex and non-differentiable terms using a consensus alternating direction method of multipliers (ADMM) optimization.

16. One or more non-transitory computer storage media storing instructions that when executed by one or more computers cause the one more computers to plan actions to be performed by a robotic agent interacting with an environment to accomplish an objective, the planning comprising:
determining an optimized trajectory of state—action pairs for accomplishing the objective, the state in each state—action pair being a state encountered by the robotic agent during interaction with the environment and the action in the state—action pair being an action to be performed by the robotic agent when the environment is in the state, and the determining comprising:
maintaining a current optimized trajectory and a current trust region radius;
linearizing an environment dynamics mapping within a vicinity of the current optimized trajectory, wherein the environment dynamics mapping defines a mapping from an input state of the environment and an input action of the robotic agent to an output state of the environment that would result from performing the input action in response to the input state of the environment;
optimizing a localized objective within the current trust region radius of the current optimized trajectory to determine a candidate updated optimized trajectory subject to a constraint that the candidate updated optimized trajectory satisfies the linearized environment dynamics mapping, wherein the constraint requires that, for each state—action pair in the candidate updated optimized trajectory before a last state—action pair in the candidate optimized trajectory:
a result of processing the state and the action in the state—action pair using the linearized environment dynamics mapping matches the state in a next state—action pair in the candidate optimized trajectory;
determining whether the candidate updated optimized trajectory improves over the current optimized trajectory; and
in response to determining that the candidate updated optimized trajectory improves over the current optimized trajectory, updating the current optimized trajectory to the candidate updated optimized trajectory and updating the current trust region radius.

17. The non-transitory computer storage media of claim 16, wherein updating the current optimized trajectory to the candidate updated optimized trajectory and updating the current trust region radius comprises:
increasing the current trust radius.

18. The non-transitory computer storage media of claim 16, wherein the planning further comprises:
   in response to determining that the candidate updated optimized trajectory does not improve over the current optimized trajectory, updating the current trust region radius without updating the current optimized trajectory.

19. The non-transitory computer storage media of claim 18, wherein updating the current trust region radius without updating the current optimized trajectory comprises:
   shrinking the current trust radius.

* * * * *